June 18, 1935.   J. F. HERMANN   2,005,464
HIGH PRESSURE JOURNAL LUBRICATOR
Filed Aug. 5, 1933   2 Sheets-Sheet 1

John F. Hermann
INVENTOR.
BY:
A. B. McCall
ATTORNEY.

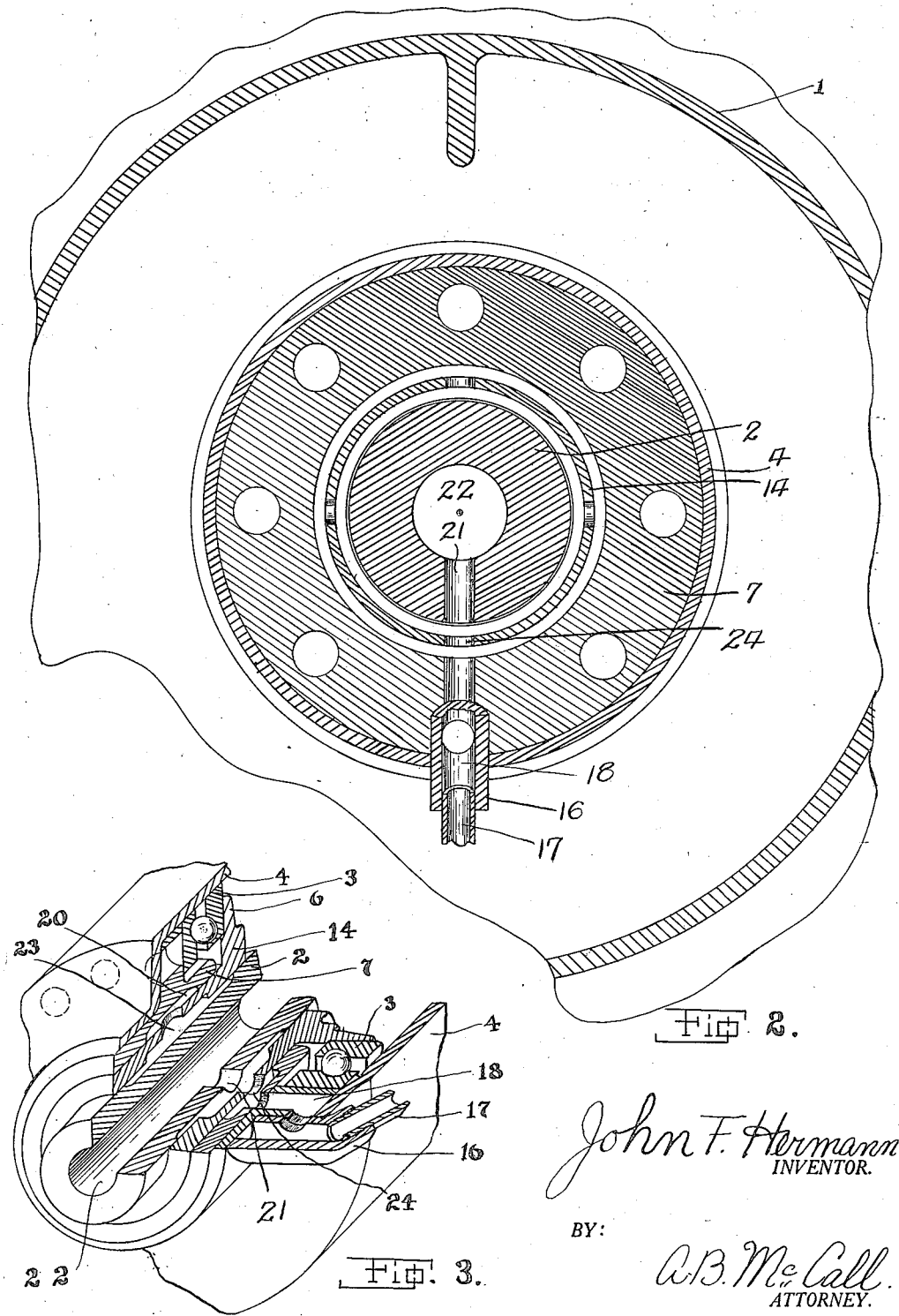

Patented June 18, 1935

2,005,464

UNITED STATES PATENT OFFICE 2,005,464

HIGH PRESSURE JOURNAL LUBRICATOR

John F. Hermann, Havana, Ill.

Application August 5, 1933, Serial No. 683,834

3 Claims. (Cl. 308—187)

My invention relates to devices and improvements therein adapted to facilitate the lubrication of journals and spindles with a maximum efficiency.

Oiling devices heretofore proposed were found to invariably fail at a critical moment, due to severe loads being superimposed upon the normal duties required of the device. The bearing load, in addition to the function of delivering oil under adverse conditions are sufficient reasons for so many bearing failures, and the consequence is that when the pressure oiling devices are subjected to heavy loads, they often become decidedly inefficient.

A purpose of my invention, therefore, is to provide a method which will overcome the drawbacks and inefficiencies experienced in the past in connection with high pressure oil injection devices.

A further purpose of my invention is to provide a high pressure lubricator for journals which is not subjected to heavy loads when in use and therefore has a better chance for efficiency in its operation.

A further purpose of my invention is to provide means by which lubricating oil under pressure can be supplied to a rotating shaft with a maximum of efficiency.

A further purpose of my invention is to provide a device as a high pressure lubricator for journals which when in normal use is thoroughly lubricated as it lubricates the journal, and which in the meantime supplies the oil channel running through the journal with a supply of oil under high pressure throughout its 360° of rotation.

I attain the objects of my invention by the device described in the annexed specification, recited in the claims, and illustrated in the accompanying drawings in which like reference numerals indicate like parts in the several figures.

Referring to the figures:

Figure 2 is a cross-section taken on line 2—2 on Figure 1.

Figure 3 is a perspective of a journal and its bearing showing in quarter-section further details of my invention.

Referring now in detail to the construction of my invention and the preferred manner of using same, I shall point out the salient features thereof as I refer to numerals which denote like parts in the respective figures.

Figure 1:
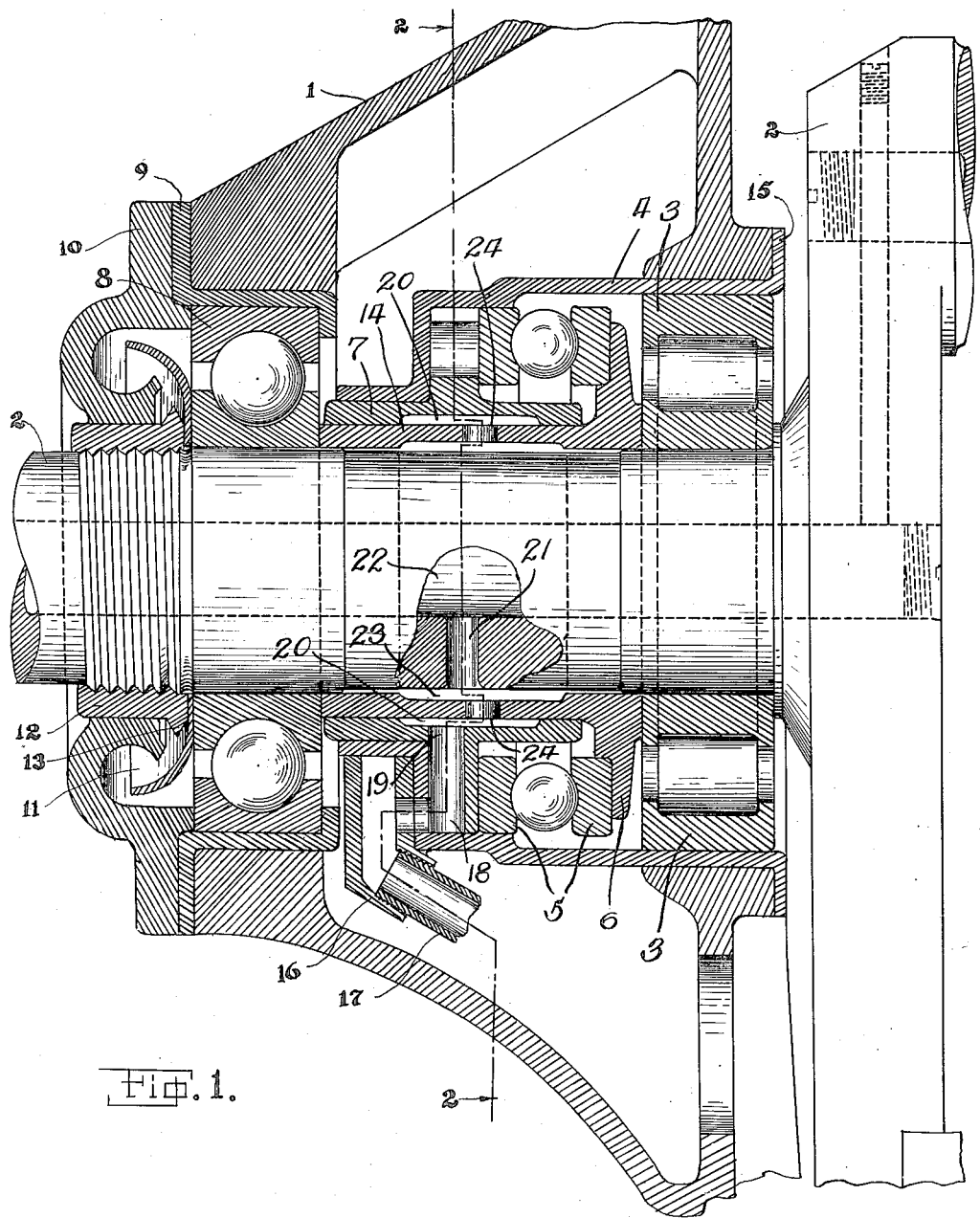
Figure 1 is a longitudinal half-section of a journal bearing of an engine, disclosing to view the details of the fitting relation of the essential features of my invention.

With my invention, I provide in connection with a crank case 1 a bearing retainer 4 adapted to receive a radial roller bearing 3 and a thrust bearing 5. One-half of bearing 5 is supported on flange 6 of bearing spacer sleeve 14; while radial ball bearing 8 is held in its retainer 9 and supported by crankcase 1 and is adapted to receive a crank shaft 2 through roller bearing 3 and thrust bearing 5 with its spacer sleeve 14.

Radial bearing 3, thrust bearing 5, and radial bearing 8 are held firmly in place by lock nut 12. The bearing compartment is closed against foreign matter by a cover plate 10, while leakage of oil to the outside is prevented by oil deflector 11 and oil slinger 13.

Bearing retainer 4 receives a right-angled centrally flanged collar 7 secured to retainer 4 and prevented from turning with crank shaft 2 by this retainer member which is firmly held within crank case 1 by a flange 15 of the retainer.

Bearing flanged spacer sleeve 14 rotates within collar 7 while bearing retainer 4 has secured thereto an oil pipe flange 16 secured to which is an oil pipe 17 and which is supplied with oil from a source of supply thereof under pressure by an oil pump not shown.

Oil from the source of supply enters passage 18, thence through passage 19 to relatively shallow but wide channel 20 in collar 7.

Crank shaft 2 is provided with a transverse passage 21 leading to a longitudinal inner channel 22 therein and is supplied with oil from channel 20 and an inner channel 23 through a series of oil passages 24. After the oil under high pressure reaches the inner channel 22 it may be distributed to various bearing points along the line coming in contact with crank shaft 2.

It will be therefore observed that as crank shaft 2 rotates with spacer sleeve 14 carrying with it a thin band of oil in annular channel 23 under high pressure which forces the oil through intake connection 17, oil pipe flange 16, oil feed passage 18 and into annular channel 20 of collar 7 creating a band of oil about the central portion of the rotating spacer sleeve 14. Since the group of oil passage holes 24 in spacer sleeve 14 establish a constant oil communication between annular oil channel 20 and annular oil channel 23 this permits the oil under high constant pressure not only to suitably lubricate the outer journal surface but also to force a constant supply of oil into the inner oil channel 22 through transverse oil passage 21.

To those who are skilled in mechanics it will be evident that the spirit and scope of my invention will permit the adaptation thereof to numerous mechanical situations requiring the lubrication of bearings and journal and having therefore set forth the salient features of my invention what I claim is:

1. A high pressure journal lubricator comprising in combination with a journal having a central passage and a communicating transverse passage for oil, a channeled collar and a channeled spacer sleeve encompassing the journal, the inner sleeve member provided with a plurality of spaced holes establishing oil communication between said inner channel of said outer collar and said inner channel of the sleeve and provided with an oil hole communcating with said inner channel thereof and attachments connected therewith for receiving lubricating oil under high pressure into said channels of the collar and sleeve; said transverse hole in said journal in constant rotatable registry with the inner channel of said sleeve, a thrust bearing support flange on said inner sleeve and an annular hood for covering and protecting said sleeve and collar.

2. A high pressure journal lubricator comprising in combination with a journal, a journal fitting sleeve, an integral thrust bearing supporting flange on the sleeve; said sleeve shaped to define a relatively wide and relatively shallow oil channel about the journal when fitted thereon, an outer collar operatively encompassing said journal fitting sleeve and shaped to define an annular channel on the inside thereof that is relatively shallow and relatively wide; said sleeve provided with a plurality of holes adapted to establish oil communication between said annular channel of the inner sleeve and outer collar and said outer collar provided with an oil feed opening communicating with said outer oil channel and means connected therewith for conducting oil thereto from a source of supply thereof; said journal adapted to be provided with a longitudinal central passage for oil and with an oil intake hole adapted to be in constant rotatable communication with said inner channel of said inner sleeve; whereby oil may be supplied under high pressure constantly to the outer surface and to the inner channel of said journal.

3. The combination with a journal of a high pressure lubricator therefor and comprising an inner sleeve fitting the journal and an outer collar encompassing the inner sleeve; said sleeve and said collar each having an inner annular channel therein and a plurality of holes provided on the inner sleeve establishing fluid communication between said channels of said collar and sleeve; said outer collar provided with a feed connection for lubricating fluid under pressure leading to the inner channel thereof and said journal having a longitudinal central passage and a transverse hole establishing lubricating fluid communication between said longitudinal passage and said inner channel of said inner sleeve; said inner collar provided with an annular integral flange for the support of a ball race of a thrust bearing, one or more bearings provided for the support of said journal and an annular hood encompassing said sleeve and collar and said bearings for the protection thereof.

JOHN F. HERMANN.